Patented Sept. 21, 1954

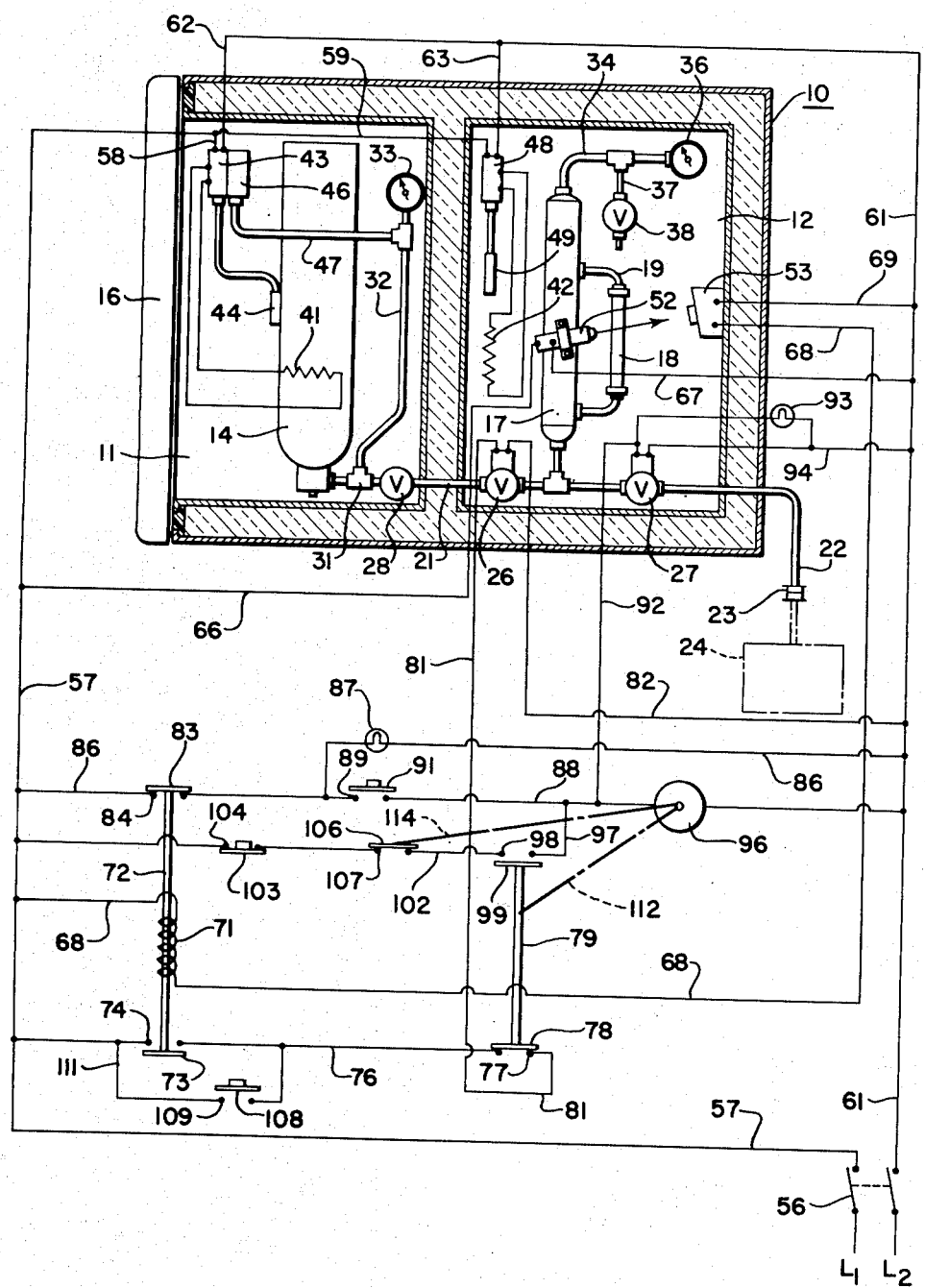

2,689,463

UNITED STATES PATENT OFFICE 2,689,463

CHARGING REFRIGERATING APPARATUS

Herman R. Arf, Dayton, Ohio, assignor to General Motors Corporation, Detroit, Mich., a corporation of Delaware Application February 12, 1953, Serial No. 336,608

10 Claims. (Cl. 62—2)

This invention relates to charging apparatus.

An object of my invention is to provide an improved method of and apparatus for charging a volatile refrigerant fluid into a unit adapted to form a part of a refrigerating system.

Another object of my invention is to provide a simplified and inexpensive semiautomatic in operation refrigerant charging apparatus for use by servicemen in workshops of dealers in refrigerators and/or refrigerating equipment.

Still another object of my invention is to provide a volatile refrigerant charging apparatus with means for automatically controlling the flow of a predetermined amount of liquid refrigerant from a source of supply thereof into a metering means which discharges the same from the apparatus into a unit or element adapted to form a part of a closed refrigerating system.

A further object of my invention is to provide a refrigerant charging apparatus having a metering container wherein the pressure of a volatile refrigerant received therein from a source of supply thereof is maintained below the pressure of the supply source and yet is maintained sufficiently high to insure rapid discharge of all of the measured refrigerant from the metering container into a unit or element to be charged.

A still further and more specific object of my invention is to provide a refrigerant charging apparatus with a metering container and suitable control valves and switches at least one of which valves is electrically operated by a photocell device responsive to changes in liquid level within the metering container so as to insure the proper amount of refrigerant to be received therein and discharged therefrom into a unit to be charged with the refrigerant.

Further objects and advantages of the present invention will be apparent from the following description, reference being had to the accompanying drawings wherein a preferred form of the invention is clearly shown.

The figure in the drawing is a schematic view of a charging apparatus embodying features of my invention.

A charging apparatus to be hereinafter more fully described is utilized for charging a predetermined metered amount of a volatile liquid refrigerant into an element or unit adapted to form a part of a closed or sealed refrigerating system. While such an element or unit may be the refrigerant translating device or sealed motor-compressor-condenser unit or a part thereof of a given size or refrigerating capacity wherein the charge will be the same for each unit, detachably connected to the apparatus, it is to be understood that modifications can be made to accommodate the charging of variously sized or capacity units without departing from the spirit of the present invention.

Referring now to the drawing, the charging apparatus comprises a box or cabinet 10 having insulated walls forming compartments 11 and 12 therein. Compartment 11 has a volatile refrigerant fluid supply tank 14 mounted or supported, in any suitable or conventional manner, therein. The box or cabinet 10 may be provided with a hinged door 16 providing access to the interior of compartment 11 so that an emptied refrigerant supply tank may be removed from this compartment for replacement by a filled tank. One side wall of box or cabinet 10 may, if desired, be constructed of a multiple glass pane structure to render gauges and other elements employed in the apparatus and located in compartments 11 and 12 visible from exteriorly thereof. A vertically elongated cylindrical metering receptacle or container 17 is mounted in the insulated compartment 12 of cabinet 10 and includes a high pressure transparent glass tubing 18 extending therealong and having its ends connected thereto for communication with the interior thereof by suitable or conventional clamping glands and pipe elbows 19. Tank 14 has a conduit or pipe 21 connecting the same to metering container 17. Container 17 has a conduit or pipe 22 connecting it to a suitable or conventional quick connect and disconnect fitting or connector 23 which removably receives an element adapted to form a part of a closed refrigerating system such, for example, as a motor-compressor-condenser unit therefor diagrammatically represented by the dot-dash lines at 24. This fitting or connector 23 can be constructed similar to a bicycle tire valve whereby refrigerant may flow into the unit 24 but is prevented from flowing back out of the unit by the connector. An inlet valve 26, preferably of a conventional solenoid operated type, is interposed in the conduit 21 leading from tank 14 into the receptacle or container 17. An outlet valve 27, preferably also of a conventional solenoid operated type, is interposed in the discharge conduit 22 leading from container 17 to fitting 23 and consequently to a unit 24 connected thereto. A manually actuated valve 28 is also interposed in conduit 21 intermediate supply tank 14 and valve 26. A T-shaped fitting 31 intermediate valve 28 and tank 14 has a branch pipe or conduit 32 extending therefrom and leading to a pressure gauge 33 within compartment 11. The metering receptacle or container 17 in compartment 12 has a conduit 34 connected to its upper end which leads to a pressure gauge 36. A branch pipe 37 leading from conduit 34 has a bleeder or the like valve 38 interposed therein and utilized for purging container 17.

Means is provided for heating the supply tank 14 and increasing the pressure of volatile refrigerant contained therein to a predetermined limit. Means is also provided for heating refrigerant received within container 17 to maintain the pressure thereof therein at a desired limit below the predetermined pressure limit within tank 14. These means are preferably in the form of electric resistance heaters 41 and 42 respectively which may directly heat tank 14 and container 17 or may heat the interior of the compartment housing the same. Heater 41 is connected by suitable wires to a temperature responsive electric switch 43 having a thermostat bulb 44 communicating therewith for actuating the same in response to the temperature of tank 14. Switch 43 also includes a normally ineffective electric switch portion 46 suitably connected or interlocked therewith and actuated in response to pressures in tank 14 by a pipe connection 47 with pipe or conduit 32 so as to operate switch 43 under abnormal pressure conditions within tank 14 in case switch 43 fails. Heater 42 in compartment 12 is connected by suitable wires to an electric switch 48 having a thermostat bulb 49 communicating therewith for actuating the same in response to temperatures prevailing in compartment 12. An electric photocell device is provided in compartment 12 and is responsive to changes in liquid level within the metering receptacle or container 17 in a manner and for a purpose to be hereinafter more fully described. This photocell device includes a source of light 52 and a light beam sensitive portion or switch 53 spaced therefrom. The construction and operation of such photocell devices are conventional and well known to those skilled in the art and for this reason no further detailed description thereof is necessary. A beam of light is adapted to be emitted from the source 52 and this beam passes through the transparent glass tube 18 into the light sensitive portion 53 of the photocell device as is customary of such devices. When the level of liquid refrigerant in glass tube 18 and consequently within metering tank 17 rises to a point to interrupt the light beam the light sensitive portion or switch 53 is automatically actuated.

A suitable electric circuit is included in the present apparatus for controlling, regulating and rendering the various elements thereof operative and/or inoperative. A source of electric current represented by the power lines L1 and L2 is provided for the electric circuit of the apparatus herein disclosed. A main throw switch 56 is adapted to connect the power lines L1 and L2 to the electric circuit of the charging apparatus. A wire 57 extends from throw switch 56 and has branches wires 58 and 59 connected to the electric switches 43 and 48 respectively. A wire 61 extends from throw switch 56 and has branch wires 62 and 63 also connected to the electric switches 43 and 48 respectively. The circuit to the source of light 52 of the photocell device includes a wire 66, branching from wire 57, and a wire 67 extending from wire 61. The light sensitive portion or switch 53 of the photocell device is connected across the main wires 57 and 61 by branch wires 68 and 69 respectively. Wire 68 of the photocell circuit has a solenoid 71 interposed therein and associated with a double arm switch 72. The one arm 73 of switch 72 is adapted to bridge and engage a pair of contacts 74 provided in a wire 76 branching from wire 57 and leading to one of a pair of contacts 77 adapted to be bridged and engaged by one arm 78 of another double armed switch 79. A wire 81 extends from the other of the pair of contacts 77 and is connected to the solenoid of valve 26. A wire 82 extends from the solenoid of valve 26 back to the main wire 61. The other arm 83 of double arm switch 72 is adapted to bridge and engage a pair of contacts 84 interposed in a wire 86, branching off wire 57, and extending through an incandescent indicator or lamp 87 to wire 61. Another wire 88, branching off wire 86, extends to wire 61 and has a pair of contacts 89 interposed therein with which a spring pressed button operated switch 91 is associated. A wire 92 extends from wire 88 and is connected to the solenoid of valve 27 and to one side of an incandescent indicator or lamp 93. The other side of lamp 93 is connected to wire 94 leading from the solenoid of valve 27 to the main wire 61. A timer or chronometrically operated means, generally represented by the reference character 96, is electrically connected or interposed in the wire 88. This timer is normally inoperative and rendered operative when electric current is directed through wires 57, 86 and 88 and back to main wire 61 for a purpose to become apparent in the description of operation of the apparatus to follow hereinafter. Timer or chronometric means 96 may be of any desired or conventional construction and such means are well known to those skilled in the art. A wire 97 branching from wire 88, intermediate switch 91 and timer 96, is connected to one of a pair of contacts 98 associated with the other arm 99 of double arm switch 79. The other of the pair of contacts 98 has a wire 102 extending therefrom and connected to main wire 57. This wire 102 has two switches interposed therein one of which is to be actuated by the timer 96 while the other is a spring pressed manually actuated and normally closed switch. For example an emergency stop switch 103 normally bridges and engages a pair of contacts 104 while another time controlled delay switch 106 bridges and engages a pair of contacts 107 in wire 102. An emergency fill spring biased manually operated switch 108 is adapted to bridge and engage a pair of contacts 109 provided in a wire 111 connected in parallel circuit relation with branch wire 76.

The double arm switch 72 is electrically actuated by the solenoid 71 while the other double arm switch 79 and also switch 106 is actuated by the timer or chronometrically operated means or device 96. Switch 106 is normally closed and is adapted to be actuated away from its contacts to open the same a predetermined interval of time of operation of timer 96 to break a circuit and cause switch 79 to move its arm 99 away from contacts 98 as will hereinafter be more fully explained. In order to actuate switches 79 and 106 from the electrically operated timer 96 these switches may be mechanically connected to a rotatable shaft of the timer by operating rods, links or shafts, shown by the dot-dash lines 112 and 114 in the drawing, suitably attached to the switches 79 and 106 respectively. The mode of connecting or attaching rods or shafts 112 and 114 to the switches 79 and 106 respectively and to the shaft of the electrically operated timer 96 for actuating the switches therefrom is conventional and well known to those skilled in the art.

Assume that a filled tank 14 of volatile refrigerant fluid is housed in compartment 11 of box or cabinet 10, hand valve 28 is closed, to prevent flow of refrigerant to the metering container 17, a unit 24 adapted to form a part of a closed refrigerating system is connected to the quick disconnector 23 and it is desired to start the apparatus to force a predetermined or metered amount of liquid refrigerant into the unit 24. The two double arm switches 72 and 79 are now in their normal position shown in the drawing and valves 26, 27 and 28 are closed. The throw switch 56 may now be closed to connect the source of electric current, power lines $L_1$ and $L_2$, to main wires 57 and 61 respectively of the apparatus. This in addition to completing a circuit through switches 43 and 48, to energize heaters 41 and 42 respectively, and through indicator lamp 87 by way of wire 86, also completes a circuit to the light source 52 of the photocell device to cause a beam of light to enter the sensitive portion 53 of the device and actuate the switch therein into closed position to thereby energize the solenoid 71, interposed in wire 68, associated with the double arm switch 72. The energization of solenoid 71 causes the same to actuate switch 72 for moving its one arm 73 into engagement with the pair of contacts 74 to thus complete a circuit from the one main wire 57 through wire 76, contacts 77 of double arm switch 79, the one arm 78 of this switch and wire 81 to the solenoid of valve 26 and through wire 82 to main wire 61 to thereby open inlet valve 26. Outlet valve 27 and hand valve 28 are at this time in closed position. The simultaneous movement of arm 83 with arm 73 of double arm switch 72 opens the contacts 84 and breaks the circuit through the lamp 87 to indicate to the operator that manual valve 28 may be opened as soon as the pressure gauge 33 registers the desired pressure of refrigerant in tank 14, being heated by heater 41, to insure rapid flow of liquid refrigerant from the tank. When this desired pressure has been reached, the operator will open hand valve 28 to cause liquid refrigerant to flow from tank 14 through the now opened solenoid inlet valve 26 into the metering container 17. The temperature of metering container 17 is maintained high by electric heater 42 so as to keep the pressure of refrigerant in container 17 high but below that of refrigerant in supply tank 14. Liquid refrigerant flowing into the vertically elongated cylindrical container 17 rises therein and consequently the level of the body of liquid refrigerant within the glass tube 18 connected to the container also rises. The level of liquid refrigerant in tube 18, to which the photocell device is responsive, is predetermined, preferably by weight, so as to discharge a given amount of liquid refrigerant into the similar sized or capacity units 24 which are to be connected to the apparatus for receiving a charge of liquid refrigerant. The indicator lamp 87, which may be of any desired color, having been illuminated as before stated and now deenergized has indicated to the operator that a charge of liquid refrigerant is being received in metering container 17.

When the level of liquid refrigerant in glass tube 18 attains a height whereby it breaks or interrupts the ray or beam of light emitted from the light source 52 of the photocell device and passing through tube 18 into the sensitive portion 53 thereof the switch in this portion 53 of the photocell device is deenergized and is actuated to open its contacts thereby deenergizing the circuit through wires 68 and 69 and consequently solenoid 71. This deenergization of solenoid 71 causes switch 72 to move, such as by gravity, whereby its one arm 73 now moves away from contacts 74, into its normal position shown in the drawing, and its other arm 83 bridges or closes contacts 84. Switch arm 73 moving away from contacts 74 opens the circuit through wire 76, contacts 77 of switch 79, and wires 81 and 82 to thus deenergize the solenoid of inlet valve 26 to cause this valve to close. Closing of contacts 84 by arm 83 of switch 72 again completes the circuit through wires 57 and 86 back to the main wire 61 to again reenergize and illuminate lamp 87. The illumination of lamp 87 indicates to the operator of the apparatus that a proper metered amount of liquid refrigerant has been received in container 17 and that this liquid refrigerant can now be expelled from container 17 and injected into a unit 24 to be connected to the apparatus and charged. Thereupon the operator will push the button of spring pressed switch 91, to close the contacts 89 associated therewith, and complete a circuit through wires 57, 86, contacts 84 of switch 72, contacts 89 of switch 91 and wire 88 through the timer or chronometric means 96 to wire 61. This completed circuit in addition to electrically driving the timer 96 also closes a circuit through the solenoid of outlet valve 27 and lamp 93, by way of wire 92, connected to wire 88, and wire 94 to open valve 27 and to illuminate lamp 93. Liquid refrigerant now flows from the metering receptacle or container 17 through conduit 22, quick disconnect valve 23 and is injected into the unit 24. At the moment switch 91 is closed to energize and start timer 96 in operation the rod or shaft 112 is instantly rotated or actuated to move the double arm switch 79. Movement of switch 79 causes its one arm 78 to open contacts 77 so as to insure that inlet valve 26 will remain closed during the charging cycle of the apparatus. Switch 79 upon being moved by rod or shaft 112, to open the contacts 77 thereof, simultaneously closes its arm 99 into bridging relation with contacts 98 to complete a holding circuit for the timer 96. This holding circuit is for the purpose of permitting timer 96 to continue its operation, for a predetermined interval of time, and for energizing the solenoid of outlet valve 27 to hold valve 27 open during this time after the button of the manually actuated switch 91 has been released by the operator. The holding circuit is completed through wires 57, 102, switch 103, time delay switch 106, contacts 98 of double arm switch 79, wires 97, 88, 92, 94 to wire 61. Lamp 93 is also energized and illuminated by this holding circuit to indicate to the operator that valve 27 is open and a charge of refrigerant is flowing from tank 17 into the unit 24. It is to be here understood that at one time during the charging cycle of the apparatus the level of the body of liquid in glass tube 18 falls to again permit the beam of light emitted from the light source 52 of the photocell device to pass through tube 18 into the light sensitive portion 53 thereof to actuate the switch within portion 53 into closed position. This again energizes solenoid 71 in wire 68 to thus actuate switch 72 and move its arm 73 into engagement with contacts 74. At this time however no electric current can flow through wires 81 and 82 to energize and cause opening of inlet valve 26 since arm 78 of switch 79 has previously been separated from the contacts 77.

After a predetermined period of time of operation of timer 96, sufficient to insure that all of the metered liquid refrigerant has been discharged from container 17 into the unit 24, this timer operates delay switch 106, by actuating rod or shaft 114 connected thereto, away from contacts 107 or into open position. This breaks the circuit through wire 57, switch 103, wire 102, arm 99, contacts 98 of switch 79, wire 97 and wire 88 leading to wire 61 through timer 96 and also through wires 92 and 94 leading to wire 61 through outlet solenoid valve 27 and signal lamp 93. In addition to valve 27 now closing and lamp 93 being deenergized, to indicate completion of a charging cycle, the deenergization of timer 96 causes rod or shaft 112 to simultaneously actuate switch 79 so that its arm 99 will move away from contacts 98 to permit switch 79 to return to its normal position shown in the drawing and to also permit delay switch 106 to again close the contacts 107. The other arm 78 of double arm switch 79 now closes the contacts 77 and since contacts 74 of switch 72 in wire 76 have been previously closed, by the photocell device as described, electric current will again flow to the solenoid of valve 26 to hold this valve open, outlet valve 27 having been previously closed, and permit a further charge of liquid refrigerant to flow into the metering container 17. The charged unit 24 is provided with a suitable check valve and this unit may now, while valve 27 is closed and metering container is being refilled, be detached from the connector 23 and removed from the apparatus. Another unit 24, to be charged, may be attached to the connector 23, at the end of conduit 22, prior to the operator pushing switch 91 to initiate another charging cycle. The charging operations may be continued one after the other as desired after which the main throw switch can be opened to render the entire apparatus inoperative.

Switch 46, connected to conduit 32 and to gauge 33, is interconnected to the thermostatically operated switch 43 in any suitable or conventional manner so as to actuate switch 43 should it become necessary. Switch 46 may serve as a safety device responsive to abnormal high pressure within tank 14. For example should switch 43 fail to shut off or deenergize heater 41 for any reason the pressure of refrigerant in tank 14 will build up abnormally and transmit this pressure to switch 46, through conduits 32 and 47, whereby the interconnection or interlock between switches 43 and 46 will be actuated by switch 46 to operate switch 43 and deenergize heater 41.

From the foregoing it should be apparent that I have provided a novel method of and apparatus for charging liquid refrigerant into a unit or element adapted to form a part of a closed refrigerating system. By making the apparatus disclosed semiautomatic in operation a certain amount of manual control over the same is retained so that an attendant can observe the apparatus and insure proper functioning thereof as a precautionary measure against failure of the apparatus and injury to workers in the vicinity of the apparatus. My apparatus is inexpensive as compared to such apparatus employed in large factories where charging of units of refrigerating systems continues throughout the day and is rapid in charging a limited quantity of units at repair shops or service stations remote from such factories.

While the form of embodiment of the invention as herein disclosed constitutes a preferred form, it is to be understood that other forms might be adopted as may come within the scope of the claims which follow.

What is claimed is as follows:

1. An apparatus for charging a predetermined amount of liquid of a volatile refrigerant fluid into a unit adapted to form a part of a closed refrigerating system comprising in combination, a tank containing a supply of volatile refrigerant, means for heating said tank to vaporize some of the volatile refrigerant therein and create a pressure in the tank adapted to force liquid refrigerant therefrom, a metering container having a conduit connection with said tank and a conduit connection with the unit to be charged, a first valve in the conduit between said tank and said container, a second valve in the conduit between said container and the unit, said first valve normally being open to permit liquid refrigerant to flow under said pressure from said tank into said metering container, said second valve normally being closed, a photocell device responsive to changes in liquid level within said container, said device being rendered effective automatically in response to a predetermined level of liquid refrigerant in said container for closing said normally open first valve, and means for opening said normally closed second valve to direct liquid refrigerant from said metering container into the unit.

2. An apparatus for charging a pretedmined amount of liquid of a volatile refrigerant fluid into a unit adapted to form a part of a closed refrigerating system comprising in combination, a tank containing a supply of volatile refrigerant, means for heating said tank to vaporize some of the volatile refrigerant therein and create a pressure in the tank adapted to force liquid refrigerant therefrom, a metering container having a conduit connection with said tank and a conduit connection with the unit to be charged, a first valve in the conduit between said tank and said container, a second valve in the conduit between said container and the unit, said first valve normally being open to permit liquid refrigerant to flow under said pressure from said tank into said metering container, said second valve normally being closed, a photocell device responsive to changes in liquid level within said container, said device being rendered effective automatically in response to a predetermined level of liquid refrigerant in said container for closing said normally open first valve, means for opening said normally closed second valve to direct liquid refrigerant from said metering container into the unit, and a timer for reclosing said second valve, said timer being normally ineffective and rendered effective by said last named means.

3. An apparatus for charging a predetermined amount of liquid of a volatile refrigerant fluid into a unit adapted to form a part of a closed refrigerating system comprising in combination, a tank containing a supply of volatile refrigerant, means for heating said tank to vaporize some of the volatile refrigerant therein and create a pressure in the tank adapted to force liquid refrigerant therefrom, a metering container having a conduit connection with said tank and a conduit connection with the unit to be charged, a first valve in the conduit between said tank and said container, a second valve in the conduit between said container and the unit, said first valve normally being open to permit liquid refrigerant to flow under said pressure from said tank into said metering container, said second valve normally being closed, a photocell device responsive to changes in liquid level within said container, said device being rendered effective automatically in response to a predetermined level of liquid refrigerant in said container for closing said normally open first valve, manually actuated means for opening said normally closed second valve to direct liquid refrigerant from said metering container into the unit, chronometrically operated means associated with said apparatus, and said chronometrically operated means being normally ineffective and rendered effective by manipulation of said manually actuated means for reclosing said second valve.

4. An apparatus for charging a predetermined amount of liquid of a volatile refrigerant fluid into a unit adapted to form a part of a closed refrigerating system comprising in combination, a tank containing a supply of volatile refrigerant, means for heating said tank to vaporize some of the volatile refrigerant therein and create a pressure in the tank adapted to force liquid refrigerant therefrom, a metering container having a conduit connection with said tank and a conduit connection with the unit to be charged, a first valve in the conduit between said tank and said container, a second valve in the conduit between said container and the unit, said first valve normally being open to permit liquid refrigerant to flow under said pressure from said tank into said metering container, said second valve normally being closed, a photocell device responsive to changes in liquid level within said container, said device being rendered effective automatically in response to a predetermined level of liquid refrigerant in said container for closing said normally open first valve, means for opening said normally closed second valve to direct liquid refrigerant from said metering container into the unit, and a timer for reclosing said second valve, a lamp for indicating that the unit is being charged, and said lamp being energized by said last named means simultaneously with the opening of said second valve.

5. An apparatus for charging a predetermined amount of liquid of a volatile refrigerant fluid into a unit adapted to form a part of a closed refrigerating system comprising in combination, a tank containing a supply of volatile refrigerant, means for heating said tank to vaporize some of the volatile refrigerant therein and create a pressure in the tank adapted to force liquid refrigerant therefrom, a metering container having a conduit connection with said tank and a conduit connection with the unit to be charged, a first valve in the conduit between said tank and said container, a second valve in the conduit between said container and the unit, said first valve normally being open to permit liquid refrigerant to flow under said pressure from said tank into said metering container, said second valve normally being closed, a photocell device responsive to changes in liquid level within said container, said device being rendered effective automatically in response to a predetermined level of liquid refrigerant in said container for closing said normally open first valve, means for opening said normally closed second valve to direct liquid refrigerant from said metering container into the unit, and a timer for reclosing said second valve, a lamp for indicating that the unit is being charged, said lamp being energized by said last named means simultaneously with the opening of said second valve, and a timer for simultaneously reclosing said second valve and deenergizing said lamp.

6. An apparatus for charging a refrigerant fluid into a unit adapted to form a part of a closed refrigerating system comprising in combination, a volatile refrigerant supply tank, an insulated compartment, a metering container with said compartment, said container having a conduit connection with said tank and a conduit connection with the unit to be charged, a first valve in the conduit between said tank and said container, a second valve in the conduit between said container and the unit, means for heating refrigerant in said supply tank to maintain the pressure thereof therein at a substantially constant predetermined limit, said first valve normally being open to permit refrigerant to flow from said tank into said metering container, said second valve normally being closed, means for heating refrigerant received in said container to maintain its pressure at a limit below said predetermined pressure limt of refrigerant in said tank, a photocell device responsive to changes in liquid level within said container, said device being rendered effective automatically in response to a predetermined level of liquid refrigerant in said container for closing said normally open first valve, and means for opening said normally closed second valve to direct liquid refrigerant from said metering container into the unit.

7. An apparatus for charging a refrigerant fluid into a unit adapted to form a part of a closed refrigerating system comprising in combination, a volatile refrigerant supply tank, an insulated compartment, a metering container within said compartment, said container having a conduit connection with said tank and a conduit connection with the unit to be charged, a first valve in the conduit between said tank and said container, a second valve in the conduit between said container and the unit, means for heating refrigerant in said supply tank to maintain the pressure thereof therein at a substantially constant predetermined limit, said first valve normally being open to permit refrigerant to flow from said tank into said metering container, said second valve normally being closed, means for heating refrigerant received in said container to maintain its pressure at a limit below said predetermined pressure limit of refrigerant in said tank, a photocell device responsive to changes in liquid level within said container, said device being rendered effective automatically in response to a predetermined level of liquid refrigerant in said container for closing said normally open first valve, means for opening said normally closed second valve to direct liquid refrigerant from said metering container into the unit, and a timer for reclosing said second valve, said timer being normally ineffective and rendered effective by said last named means.

8. An apparatus for charging a refrigerant fluid into a unit adapted to form a part of a closed refrigerating system comprising in combination, a volatile refrigerant supply tank, an insulated compartment, a metering container within said compartment, said container having a conduit connection with said tank and a conduit connection with the unit to be charged, a first valve in the conduit between said tank and said container, a second valve in the conduit between said container and the unit, means for heating refrigerant in said supply tank to maintain the pressure thereof therein at a substantially constant predetermined limit, said first valve normally being open to permit refrigerant to flow from said tank into said metering container, said second valve normally being closed, means for heating refrigerant received in said container to maintain its pressure at a limit below said predetermined pressure limit of refrigerant in said tank, a photocell device responsive to changes in liquid level within said container, said device being rendered effective automatically in response to a predetermined level of liquid refrigerant in said container for closing said normally open first valve, manually actuated means for opening said normally closed second valve to direct liquid refrigerant from said metering container into the unit, chronometrically operated means associated with said apparatus, and said chronometrically operated means being normally ineffective and rendered effective by manipulation of said manually actuated means for reclosing said second valve.

9. An apparatus for charging a refrigerant fluid into a unit adapted to form a part of a closed refrigerating system comprising in combination, a volatile refrigerant supply tank, an insulated compartment, a metering container within said compartment, said container having a conduit connection with said tank and a conduit connection with the unit to be charged, a first valve in the conduit between said tank and said container, a second valve in the conduit between said container and the unit, means for heating refrigerant in said supply tank to maintain the pressure thereof therein at a substantially constant predetermined limit, said first valve normally being open to permit refrigerant to flow from said tank into said metering container, said second valve normally being closed, means for heating refrigerant received in said container to maintain its pressure at a limit below said predetermined pressure limit of refrigerant in said tank, a photocell device responsive to changes in liquid level within said container, said device being rendered effective automatically in response to a predetermined level of liquid refrigerant in said container for closing said normally open first valve, a lamp indicating that the unit is being charged, and said lamp being energized by said last named means simultaneously with the opening of said second valve.

10. An apparatus for charging a refrigerant fluid into a unit adapted to form a part of a closed refrigerating system comprising in combination, a volatile refrigerant supply tank, an insulated compartment, a metering container within said compartment, said container having a conduit connection with said tank and a conduit connection with the unit to be charged, a first valve in the conduit between said tank and said container, a second valve in the conduit between said container and the unit, means for heating refrigerant in said supply tank to maintain the pressure thereof therein at a substantially constant predetermined limit, said first valve normally being open to permit refrigerant to flow from said tank into said metering container, said second valve normally being closed, means for heating refrigerant received in said container to maintain its pressure at a limit below said predetermined pressure limit of refrigerant in said tank, a photocell device responsive to changes in liquid livel within said container, said device being rendered effective automatically in response to a predetermined level of liquid refrigerant in said container for closing said normally open first valve, said lamp being energized by said last named means simultaneously with the opening of said second valve, and a timer for simultaneously reclosing said second valve and deenergizing said lamp.

References Cited in the file of this patent

UNITED STATES PATENTS

| Number | Name | Date |
|---|---|---|
| 2,151,935 | Petroe | Mar. 25, 1939 |
| 2,433,560 | Hurley, Jr. | Dec. 30, 1947 |
| 2,511,637 | Johannes | June 13, 1950 |